(No Model.)
2 Sheets—Sheet 2.
J. W. GIBBONEY.
BALANCE.
No. 502,433. Patented Aug. 1, 1893.
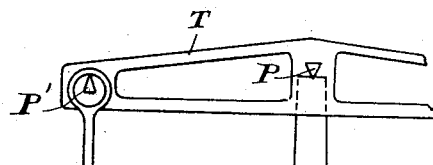
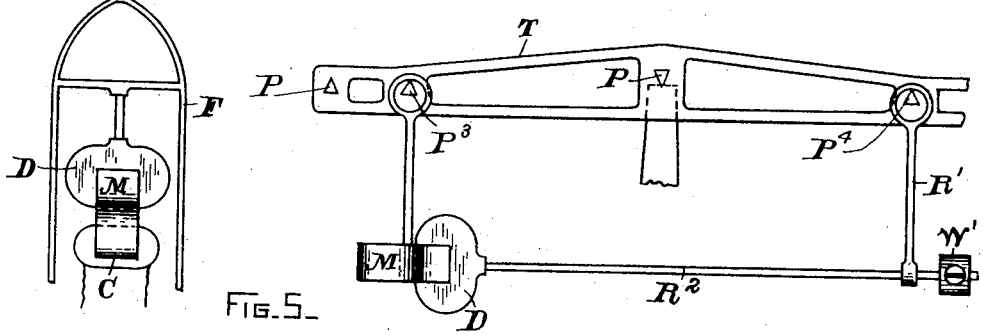
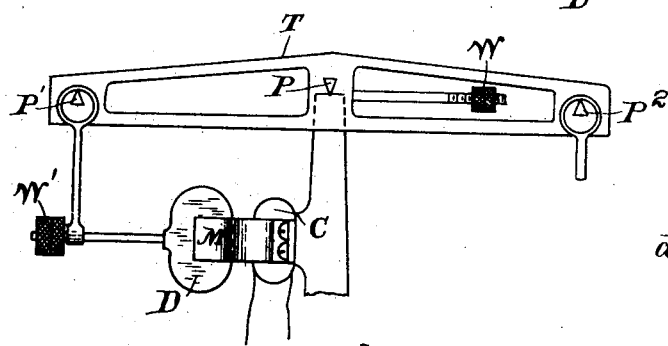
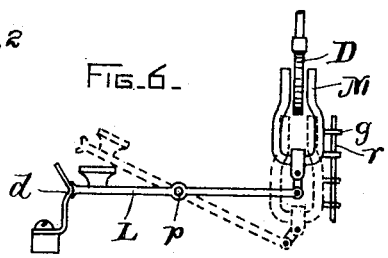
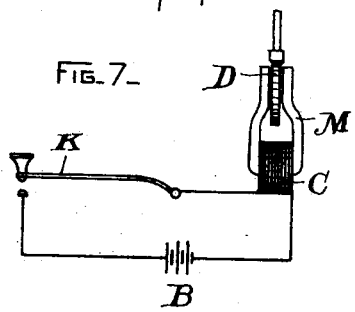
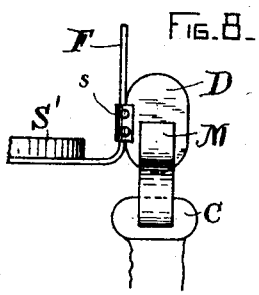
WITNESSES  
Alec F. Macdonald  
Benjamin B. Hull
INVENTOR  
John W. Gibboney

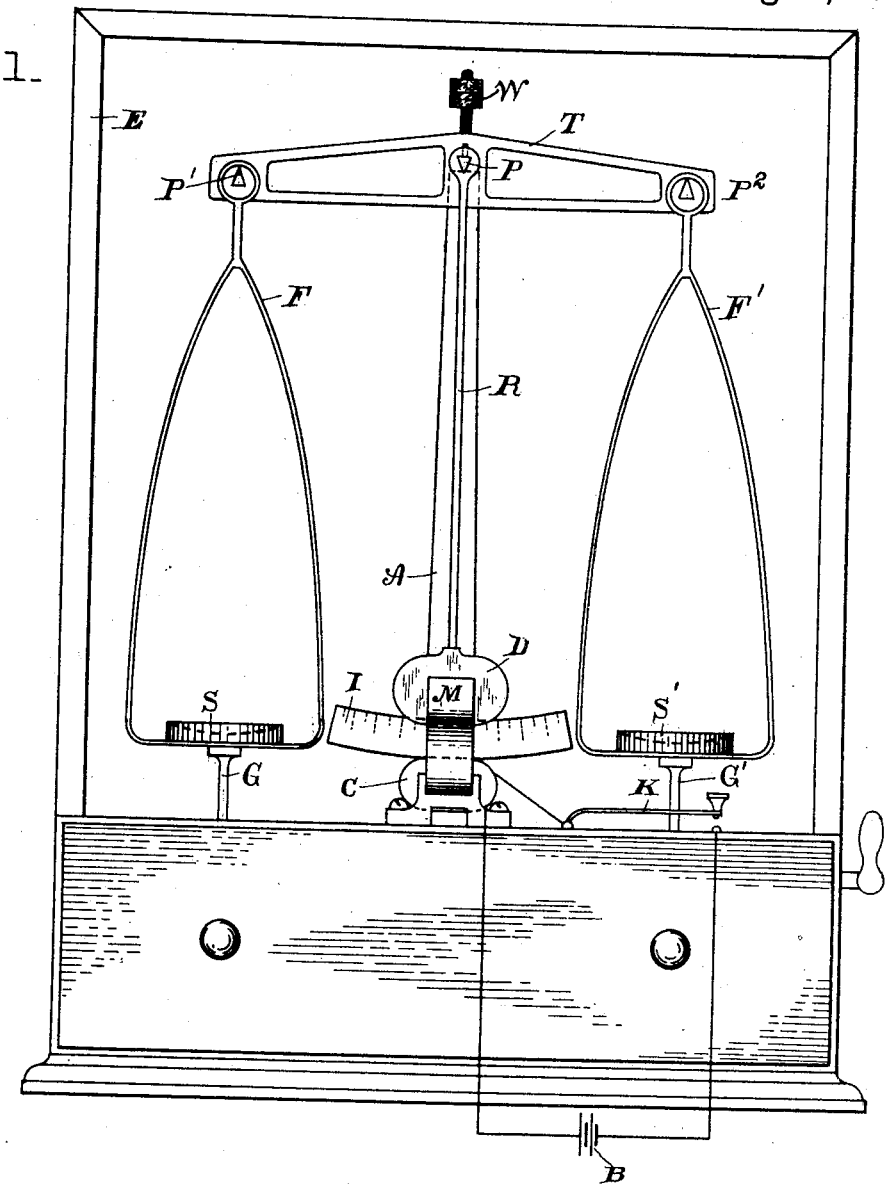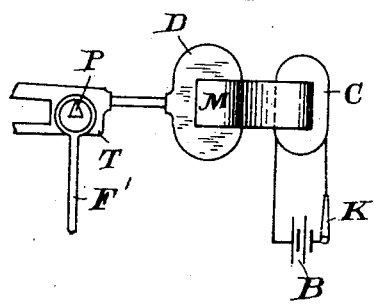

UNITED STATES PATENT OFFICE.

JOHN W. GIBBONEY, OF LYNN, MASSACHUSETTS.

BALANCE.

SPECIFICATION forming part of Letters Patent No. 502,433, dated August 1, 1893.

Application filed March 8, 1893. Serial No. 465,133. (No model.)

*To all whom it may concern:*

Be it known that I, JOHN W. GIBBONEY, a citizen of the United States, and a resident of Lynn, in the county of Essex, State of Massachusetts, have invented a new and useful Improvement in Balances, of which I describe and claim as follows.

This invention concerns improvements in balances or scales and it relates more particularly to the extremely sensitive, most perfect forms of balances, such as the chemical balance, the assay balance, &c., though I do not wish it to be understood that I consider its application is limited to such balances. It is well known that the equilibrium of the balance affords a criterion of equality of weight, and that the greater the sensitiveness of the balance becomes the less is the weight required to disturb the condition of equilibrium. Owing then to the ready response of such apparatus to minute forces it is found in its use that an extremely slight preponderance of power in one direction or the other starts the balance into oscillation which movements tend to continue for a considerable time and prolong the operation of weighing by making it difficult to note the relative deflections from the zero point or mark of equilibrium, and it is a fact that in weighing the operator usually counts the divisions each side of the zero traversed by the needle in its oscillations, and by a number of observations determine whether they are equal, in which case the balance is established, or not. In the fine forms of balance mechanical arrangements have been applied to prevent this setting up of excessive oscillation, that is supports have been placed under the scale pans, or other part of the balance, which prevent motion until the substance to be weighed or the weights have been placed in the pans after which the supports are removed, as nearly as possible simultaneously. This, however, only prevents movement due to other causes than difference of weight on the two sides of the beam, and, moreover, it is practically impossible to remove two such supports simultaneously, and thus an initial tendency to movement is established during such removal.

My invention aims to overcome these difficulties and render the operation of weighing with such exquisitely constructed apparatus more speedy than has hitherto been possible, thus saving the time of highly skilled persons, and it consists in an organization of the balance by which its energy of oscillation is translated into an electric current and prolonged or continued motion is prevented.

My invention further consists in special arrangements and constructions of the above mentioned apparatus which will be more fully described hereinafter and then set out in the claims.

Figure 1 shows a balance to which my invention has been applied. Figs. 2, 3, 4, 5, 6, 7, and 8 show modifications of the invention and also exemplify various relations of parts which are to be observed in carrying the invention into practice.

In Fig. 1 R, is an upright support or standard upon which is accurately pivoted at P, a beam T, provided with other pivots P', and P², with their edges nearly in the same plane, and as equidistant from, P as possible, and carrying the scale pans S, S', by a hanging frame F, F', all arranged in the usual manner. The apparatus is also placed in a case E, as shown, to protect it from air currents.

G, and G', represent the supports which I have mentioned above and which take the weight of the scale pans, &c., when a weighing is not being made.

R, is a rod fastened to the beam T, at its center and carrying at its lower end a conductor of electric currents, such as a thin plate of aluminum, silver, copper, &c., and secured in this manner it will vibrate from side to side with the beam T.

M is a magnet, either a permanent or an electro-magnet, between whose poles the conductor D, must pass in its movements. A weight W, adjustable toward and from the pivot and set above the beam acts as a counterpoise to the weight of the conductor D. The supports G, and G', are removed when the weight is to be tested, and any oscillations set up by difference of weight on the two sides of the beam, or those set up by the removal of the stops G, G', and which would ordinarily continue for a considerable time, are now soon checked, because the disk D, in passing between the poles of the energized magnet M, becomes the seat of electric currents flowing in a closed circuit, and the apparatus soon comes to rest. It is to be observed that the retarding effect of the conductor D, as influenced in its passage past the magnet M, increases very rapidly with the increase of the rate of motion, but that it diminishes just as rapidly with decrease of speed and finally becomes *nil*. Hence, the sensitiveness of the balance is not impaired in the slightest degree, and the only effect of the conductor and magnet is to prevent continued motion and bring the apparatus quickly to a state of rest when any deflection due to difference of weight may be noted.

It is desirable and indeed necessary that the person conducting the operation of weighing shall have confidence in the sensitiveness of the instrument, and as it is usual to test this by noting the freedom of oscillation, I prefer to so arrange the apparatus that the influence of the magnet M, may be removed from the conductor D, at the start, until the operator is convinced that no friction or other trouble is causing a sluggishness of movement, after which the retarding effect is brought into action, as stated. The preferred mode of accomplishing this is to make the magnet M, and electro-magnet, and in this figure I have therefore shown it as surrounded by a coil C, included in a battery circuit B, when the switch or key K, is closed. The size of the conductor D, the magnet M, and the power of the current source is, of course, determined entirely by the size and sensitiveness of the balance itself. In very large balances or scales where the sensitiveness is low compared with the apparatus described I contemplate, indeed, the use of gearing between the beam and the conductor D, so as to proportionately multiply the latter's movement and increase the retarding effect. An electro-magnet and key need not, however, be employed, as a permanent magnet might be used in its stead and bodily removed during the test for sensitiveness of the balance. This will be brought out hereinafter.

It is necessary, in case any part of the balance, that is a moving part, is composed of magnetic material, or in case magnetic material is to be weighed, such as iron, nickel, or cobalt, &c., to avoid the influence which the magnet M, would have thereupon by its attraction and which would cause a false weighing. In case an electro-magnet is used as I have above described, it need not be energized when a magnetic material is placed in the scale pan, or, again, the disk D may be supported upon other parts of the apparatus further removed from the magnetic material than when it is situated near the base of the pillar A. Thus, in Fig. 2 T, represents one end of the beam T, Fig. 1, and F, the scale frame supported on the pivot P, and the conductor D, is carried upon a lateral extension, as shown, passing between the opposed poles of the magnet M, which may be energized by current from the battery B, by closing the switch K, as before. It is presumed in this case that the pivots P are of non-magnetic substance and not steel. As it is always necessary to add weight to one side of the beam sufficient to act as a counterpoise for the conductor D, situated upon the other side, I prefer to employ two conductors D, of equal weight each adapted to pass near the pole of its own magnet. In Fig. 1, I would place a conductor like D, Fig. 2, upon each end of the beam T, and this arrangement reduces the weight of the conductor which it is necessary to load upon the balance. Again, as shown in Fig. 3, the conductor D, may be directly attached to the frame F, the magnet M, being suitably supported upon the standard A, or other stationary part. I would mention here that similar letters of reference in the different figures indicate corresponding parts of the apparatus.

I have shown a still further modification in Fig. 4. Here it is proposed to support both elements, the magnet M, and the conductor D, upon the beam in such manner that each partakes of the movements of oscillation, but being arranged, respectively, each side of the pivot P, they move in opposite directions. A counterpoise W′, offsets the weight of the conductor D, as in Fig. 1. This arrangement gives double the relative rate of motion of the conductor D, but of course has the objection that it loads the beam unduly. In this figure I have likewise shown that the conductor D, and the magnet M, one or both, may be hung from independent pivots, $P^3$, $P^4$, if desired.

In Fig. 5 the conductor D with its counterpoise W′, is hung upon the pivot P′, which also carries the scale pan, the conductor D, being brought near to the standard A, upon which the magnet M, is carried. The object of supporting the conductor D, as far as possible from the pivot P, is to get the greatest possible speed of motion. If a diminished retarding effect will answer in any case the conductor D, may be supported nearer to the pivot P, and it might indeed be supported directly above the magnet M, Fig. 5, in some cases.

In Fig. 6 I have shown a permanent magnet capable of being moved toward and from the conductor D, as mentioned above. The magnet M, is suitably swung or supported, as upon a lever L, pivoted at $p$. In one position it may embrace the conductor between its poles, and in the other position, as shown by the dotted lines, may be swung aside. To cause it to move in a right line and not strike the plate D, it may be guided by a rod $r$, passing through holes $g$. It is retained in the position shown by the dotted lines by its own weight, and in the position of action or working by a catch or detent $d$.

Fig. 7 shows the proper relation of the conductor D, with respect to the magnet M, that is occupying the space immediately between its poles. I prefer to make the conductor D, very thin and light and of some metal of low specific gravity, such as aluminum, in order that but little weight need be added to the beam T. A magnet with a single pole acting on the conductor D, would give a retarding effect less in amount.

In Fig. 8 I show that the conductor D, may be attached at or near the scale pan in which the weights are put, and also that it may be so fashioned that it can readily be applied to balances already in use. I have shown the conductor D, provided with a small clamp by which it is attached to the swinging frame F, by the screws $s, s$. It might also be secured thereto by means of leaf lead, or other flexible metal. The magnet M, would be carried on a base, movable or not, in the case and near to the conductor, and it may be either an electro-magnet or a permanent magnet the former being much preferred on account of the reasons stated. The weakening of the battery after much use need not be specially considered as it only results in the beam not coming to rest quite so quickly.

While I have herein specially shown and described balances having pivots it is of course evident that the device of my invention is equally applicable to those balances known as "torsion" balances, in which pivots are dispensed with.

Having thus described my invention, what I think is new, and desire to secure by Letters Patent, is—

1. The combination in a balance of a beam, a support therefor, a scale pan or platform connected with the beam, an electric generator, comprising a field magnet and an electric conductor, such as a metal plate, adapted to move near the pole of said magnet without touching the same, and a connection or connections from the beam to a moving part of said electric generator, for dampening or checking the oscillations of the beam.

2. The combination in a balance of a poised lever, a pivoted scale pan, and a device for arresting their oscillation consisting of a magnet and a conducting plate in relative movable arrangement and cooperating therewith.

3. In a scale or balance, the combination of the beam, the scale pan, or platform the index, a conducting plate moving therewith, and a magnet, permanent or not, for setting up electric currents in the plate, for the purpose mentioned.

4. The combination in a scale or balance of a poised or pivoted beam, the scale pan, the conductor plate supported by the beam and moving therewith, a magnet disposed when energized to set up electric currents in the moving conductor plate, a source of electric current, and a key or switch for closing a circuit and energizing said magnet.

5. The combination in a balance or scale of a poised or pivoted beam or lever, a scale pan pivotally supported from the beam, a metal conducting plate also carried by the beam or moving therewith, a magnet adapted to set up currents in the plate when it is in motion and means for putting the plate and magnet in inoperative relation, substantially as described.

6. The combination in a scale or balance of a scale pan or platform supported on a poised beam or lever, a field magnet and electric conductor adapted to be moved relatively by the oscillations or movements of the beam or lever and to retard or check such oscillations by setting up electric currents in said conductor, a source of current, and a switch controlling a circuit including coils wound upon or influencing said magnet.

Signed at Lynn, Massachusetts, March 6, 1893.

JOHN W. GIBBONEY.

Witnesses:
BENJAMIN B. HULL,
JOHN T. BRODERICK.